United States Patent
Tada et al.

(10) Patent No.: US 9,368,805 B2
(45) Date of Patent: Jun. 14, 2016

(54) CATALYST FOR POLYMER ELECTROLYTE FUEL CELL AND METHOD FOR PRODUCING THE SAME

(75) Inventors: Tomoyuki Tada, Kanagawa (JP); Koichi Matsutani, Kanagawa (JP); Takeshi Kaieda, Kanagawa (JP); Katsuichiro Hayakawa, Kanagawa (JP); Hitoshi Nakajima, Kanagawa (JP)

(73) Assignee: TANAKA KIKINZOKU KOGYO K.K, Tokyo (JP)

( * ) Notice: Subject to any disclaimer, the term of this patent is extended or adjusted under 35 U.S.C. 154(b) by 247 days.

(21) Appl. No.: 13/988,104

(22) PCT Filed: Dec. 2, 2011

(86) PCT No.: PCT/JP2011/077917
§ 371 (c)(1),
(2), (4) Date: May 17, 2013

(87) PCT Pub. No.: WO2012/077598
PCT Pub. Date: Jun. 14, 2012

(65) Prior Publication Data
US 2013/0244137 A1    Sep. 19, 2013

(30) Foreign Application Priority Data
Dec. 8, 2010   (JP) .............................. 2010-273347

(51) Int. Cl.
*H01M 4/92* (2006.01)
*H01M 4/90* (2006.01)
*H01M 4/88* (2006.01)
*H01M 8/10* (2016.01)

(52) U.S. Cl.
CPC ............ *H01M 4/926* (2013.01); *H01M 4/8882* (2013.01); *H01M 4/9083* (2013.01); *H01M 2008/1095* (2013.01); *Y02E 60/50* (2013.01)

(58) Field of Classification Search
CPC .. H01M 4/926; H01M 4/8882; H01M 4/9083
See application file for complete search history.

(56) References Cited

U.S. PATENT DOCUMENTS

| | | | |
|---|---|---|---|
| 2005/0233183 A1* | 10/2005 | Hampden-Smith et al. | 429/12 |
| 2007/0003822 A1 | 1/2007 | Kocha et al. | 429/482 |
| 2007/0231671 A1* | 10/2007 | Inasaki et al. | 429/40 |
| 2007/0238001 A1* | 10/2007 | Koyama | H01B 1/122 429/480 |
| 2011/0195339 A1* | 8/2011 | Iijima et al. | 429/484 |

FOREIGN PATENT DOCUMENTS

| | | |
|---|---|---|
| JP | 2009-500789 | 1/2009 |
| JP | 2010-15970 | 1/2010 |
| JP | 2010-27364 | 2/2010 |
| JP | 2010-161034 | 7/2010 |
| WO | WO 2010047415 A1 * | 4/2010 |

* cited by examiner

*Primary Examiner* — Jonathan Jelsma
(74) *Attorney, Agent, or Firm* — Roberts & Roberts, LLP

(57) ABSTRACT

The present invention provides a catalyst for a polymer electrolyte fuel cell including catalyst particles made of platinum supported on a carbon powder carrier, wherein the carbon powder carrier includes 0.7 to 3.0 mmol/g (based on the weight of the carrier) of a hydrophilic group bonded thereto; and the platinum particles have an average particle size of 3.5 to 8.0 nm and the platinum specific surface area based on CO adsorption (COMSA) of 40 to 100 $m^2/g$. The catalyst for a polymer electrolyte fuel cell according to the present invention is a catalyst excellent in initial activity and satisfactory in durability.

12 Claims, No Drawings

CATALYST FOR POLYMER ELECTROLYTE FUEL CELL AND METHOD FOR PRODUCING THE SAME

BACKGROUND OF THE INVENTION

1. Field of the Invention

The present invention relates to a catalyst for a polymer electrolyte fuel cell. In particular, the present invention relates to a catalyst useful for use in the air electrode of a polymer electrolyte fuel cell.

2. Description of the Related Art

A fuel cell, in particular, a polymer electrolyte fuel cell is highly expected as a next-generation power generating system, and has advantages of being low in working temperature and compact. Because of such advantages, polymer electrolyte fuel cells are regarded as promising as household and automobile power supplies. A polymer electrolyte fuel cell has a laminate structure consisting of a hydrogen electrode and an air electrode, and a polymer electrolyte membrane sandwiched between these electrodes. A hydrogen-containing fuel is fed to the hydrogen electrode, and oxygen or air is fed to the air electrode, and electric power is taken out on the basis of the oxidation reaction and the reduction reaction occurring in the respective electrodes. To each of both electrodes, a mixture composed of a catalyst to promote the electrochemical reaction and a solid electrolyte is generally applied.

As the catalysts constituting the electrodes, catalysts supporting precious metals as catalytic metals, in particular, platinum catalysts supporting platinum are widely used. The reasons for the use of the platinum catalysts as the catalysts for fuel cells reside in the activity of the platinum catalysts. Specifically, the foregoing reasons are ascribable to the fact that the platinum catalysts have high activity in promoting the electrode reactions in both of the fuel electrode and the hydrogen electrode.

As the recent popularization of fuel cells has become realistic, the catalyst for the polymer electrolyte fuel cell is required not only to be excellent in activity but also to be improved in various properties.

Examples of the requirements for the improvement of the catalytic properties include the improvement of the durability, namely, the improvement of the activity sustainability over a long period of time. Catalysts inevitably undergo the activity degradation occurring with the passage of time; however, the extension of the time until the deactivation can be said to be essential for the purpose of practical application of fuel cells. In this connection, as a method for improving the durability of the catalyst for a fuel cell, the method described in Patent Document 1 may be cited. The catalyst described in Patent Document 1 is a platinum supporting platinum catalyst subjected to heat treatment (annealing treatment) in such a way that the platinum particle size is regulated to be a predetermined particle size.

PRIOR ART DOCUMENT

Patent Document

Patent Document 1: National Publication of International Patent Application No. 2009-500789

SUMMARY OF THE INVENTION

Problems to be Solved by the Invention

The foregoing conventional platinum catalyst can promote the improvement of the durability of the platinum catalyst with a comparatively simple method. However, according to the present inventors, the conventional catalyst has been verified to be poor in the activity in the initial stage (initial power generation property). When an electrode including a catalyst low in the initial activity is applied, the fuel cell is required to be subjected to a treatment before power generation over a sufficient time, and hence no efficient operation can be expected.

Accordingly, the present invention provides a catalyst for a polymer electrolyte fuel cell excellent in initial activity (initial powder generation property) and also satisfactory in durability. The method for producing the catalyst is also described in detail.

Means for Solving the Problems

The present inventors investigated, for the purpose of achieving the foregoing objects, the factors causing such low initial activity (initial power generation property) of the platinum catalyst subjected to annealing treatment. Consequently, the present inventors have inferred that in the platinum catalyst subjected to annealing treatment, the functional groups, in particular, the hydrophilic groups on the surface of the carrier of the catalyst are remarkably reduced and this reduction is the factor causing the reduction of the catalytic activity. In the polymer electrolyte fuel cell, the protons produced by the reaction on the surface of the catalyst in the electrode conduct through the intermediary of moisture and the electrolyte to generate power. Accordingly, the catalyst is required to have hydrophilicity (wettability) to the moisture and the like. In contrast, it is inferred that the platinum catalyst subjected to annealing treatment undergoes the disappearance of the functional groups on the surface of the carrier caused by the effect of the heat due to the treatment, and undergoes the degradation of the wettability, and hence cannot exhibit sufficient activity (property) in the initial stage. Accordingly, the present inventors have thought up the present invention, by considering, on the basis of the investigation results, that the initial activity can be ensured by introducing the disappeared hydrophilic groups into the platinum catalyst subjected to annealing treatment.

Specifically, the present invention provides a catalyst for a polymer electrolyte fuel cell including catalyst particles made of platinum supported on a carbon powder carrier, wherein the carbon powder carrier includes 0.7 to 3.0 mmol/g (based on the weight of the carrier) of a hydrophilic group bonded thereto; and the platinum particles have an average particle size of 3.5 to 8.0 nm and the platinum specific surface area based on CO adsorption (COMSA) of 40 to 100 $m^2/g$.

The catalyst according to the present invention is in a condition such that the average particle size of the platinum particles are regulated by annealing treatment, and under such a condition, a hydrophilic functional group is added within a predetermined range. Hereinafter, these two features are described.

The hydrophilic group to be introduced into the carbon powder as a carrier is a hydrophilic functional group in a broad sense, and represents a functional group soluble in sodium hydroxide, sodium carbonate and sodium hydrogen carbonate. More specifically, a hydroxyl group, a lactone group and a carboxyl group are cited. The functional group to be bonded to the carrier may be one of the foregoing groups, or alternatively, may be a combination of two or more of the foregoing groups. The amount of the bonded functional group is set at 0.7 to 3.0 mmol/g based on the weight of the carrier. When the amount of the bonded functional group is less than 0.7 mmol/g, the hydrophilicity of the catalyst cannot be ensured, and no sufficient initial property can be exhibited. On the other hand, the upper limit is set at 3.0 mmol/g, for the purpose of avoiding a too high hydrophilicity of the catalyst (carrier). As described below, for the introduction of the hydrophilic group into a catalyst, a wet method in which the catalyst is immersed in an appropriate acid solution is generally used. In this case, when the hydrophilicity of the carrier is too high, it becomes difficult to separate (filter out) the catalyst after the treatment from the solution. Accordingly, the amount of the bonded hydrophilic group is limited.

The carbon powder as a carrier having a specific surface area of 250 to 1200 m$^2$/g is preferably applied. This is because the specific surface area set at 250 m$^2$/g or more allows the catalyst adhering area to be increased, and hence the catalyst particles can be dispersed in a high density, and on the other hand, when the specific surface area exceeds 1200 m$^2$/g, the proportion of the ultrafine pores (less than about 20 Ö) hardly allowing the ion exchange resin to penetrate thereinto in the formation of the electrode and hence the utilization efficiency of the catalyst particles becomes low.

The average particle size of the platinum particles is set at 3.5 to 8.0 nm because the average particle size of less than 3.5 nm does not allow the activity sustainability over a long period of time to be definitely obtained, and the average particle size exceeding 8.0 nm does not allow the initial mass activity of the catalyst to be sufficiently obtained. In the present invention, the platinum specific surface area based on the CO adsorption (COMSA) is specified and the range thereof is restricted to a range from 40 to 100 m$^2$/g. Such a constitution itself does not make the performance of the catalyst highly function, but makes definite the record of being subjected to the annealing treatment for improving the durability. In other words, such a constitution is for the purpose of making definite the difference from the conventional catalysts having hydrophilic group while platinum particles are being supported on the carriers. The platinum specific surface area of the platinum particles on the conventional platinum catalysts prepared only by having the platinum particles supported on the carriers (specific surface area: 250 to 1200 m$^2$/g) without being subjected to annealing treatment is generally 100 to 150 m$^2$/g.

Additionally, in the catalyst according to the present invention, the foregoing hydrophilic group is preferably introduced within a predetermined range, and the carrier surface (catalyst surface) preferably adsorbs a predetermined amount of water vapor. The water vapor on the carrier surface also affects the wettability of the catalyst, and consequently varies the initial activity of the catalyst. Such water vapor tends to disappear by annealing treatment similarly to the hydrophilic group. Accordingly, the catalyst subjected to annealing treatment is preferably made to adsorb water vapor together with the hydrophilic group.

The water vapor adsorption amount on the catalyst surface is preferably 150 to 250 cm$^3$/g (in STP) based on the mass of the catalyst. This is because when the water vapor adsorption amount is less than 150 cm$^3$/g, the condition of the catalyst is not different substantially from the annealed catalyst and such adsorption of water vapor is ineffective. When the water vapor adsorption amount exceeds 250 cm$^3$/g, the moisture possibly inhibits the catalytic activity. The water vapor adsorption amount can be measured by obtaining the water vapor adsorption isotherm with a gas/vapor adsorption amount measurement apparatus.

The catalyst according to the present invention preferably has a supporting density of the catalyst particles set at 30 to 70% in consideration of the performance as the electrode of the polymer electrolyte fuel cell. Here, the supporting density means the ratio of the mass of the catalyst particles (in the present invention, the total mass of the mass of platinum and the mass of the additive metal(s)) to the mass of the whole catalyst.

The method for producing the catalyst for the polymer electrolyte fuel cell, according to the present invention is described. The method for producing the catalyst for a polymer electrolyte fuel cell according to the present invention includes, on the basis of the feature thereof, a step of performing annealing treatment of the platinum catalyst and a step of bonding a hydrophilic group to the catalyst after the treatment. Specifically, the production method includes a step of heat treating a platinum catalyst prepared by allowing the carbon powder carrier to support platinum particles at 600 to 1180° C. for 1 hour or less, and a step of at least once bringing the platinum catalyst after the heat treatment into contact with an oxidizing solution for bonding a hydrophilic group to the surface of the carrier.

Accordingly, the preparation of the platinum catalyst before annealing treatment is produced in the same manner as for conventional platinum catalysts. In the production method of the platinum catalyst, by immersing a carbon powder in a platinum salt solution for reduction treatment, a platinum catalyst supporting platinum particles can be obtained.

In the heat treatment of the platinum catalyst, the platinum catalyst is heat treated at 600 to 1180° C. for 1 hour or less. This is because when the heat treatment temperature is lower than 600° C., the average platinum particle size of 3.5 nm or more is not obtained and no activity sustainability over a long period of time is obtained, and when the heat treatment temperature exceeds 1180° C., the average platinum particle size becomes larger than 8.0 nm, and the initial mass activity degradation of the catalyst becomes remarkable.

The bonding of the hydrophilic group to the carrier after the heat treatment is performed by bringing the catalyst into contact with an oxidizing solution. Examples of the preferable oxidizing solution to be used here include the solutions of sulfuric acid, nitric acid, phosphorous acid, potassium permanganate, hydrogen peroxide, hydrochloric acid, chloric acid, hypochlorous acid and chromic acid. The oxidizing solution treatment is not restricted to the case where the catalyst is once brought into contact with the oxidizing solution, but also the contact with the oxidizing solution may be performed repeatedly a plurality of times. In the case where a plurality of times of acid treatment are performed, the type of the solution may be altered every treatment. As the conditions of the oxidizing solution treatment, the concentration of the solution is preferably 0.1 to 10.0 mol/L, and immersion of the catalyst in the solution is preferable. The immersion time is preferably 0.5 to 3 hours, and the treatment temperature is preferably 50 to 90° C.

The adsorption of a predetermined amount of water vapor on the catalyst surface is enabled by regulating the dissolved oxygen in the oxidizing solution in the treatment of bringing the catalyst into contact with the oxidizing solution. The amount of the dissolved oxygen in the oxidizing solution is preferably set at 0.01 to 0.02 cm$^3$/cm$^3$ (the oxygen volume (in STP) per 1 cm$^3$ of the oxidizing solution). When the number of the times of the contact treatment is set at two or more while the amount of the dissolved oxygen in the oxidizing solution is being maintained within the foregoing range, the adsorption of water vapor and the bonding of the hydrophilic group can be efficiently performed simultaneously.

Advantageous Effects of Invention

As described above, the catalyst according to the present invention is a catalyst improved in the durability due to heat treatment and excellent in the initial power generation property. The method for producing the catalyst allows the hydrophilic group to be added by the oxidizing solution treatment so as to enable the property improvement to be simply performed.

DETAILED DESCRIPTION OF THE PREFERRED EMBODIMENTS

First Embodiment

In the present embodiment, a platinum catalyst was produced, and the resulting catalyst was subjected to the annealing treatment and the introduction of the hydrophilic group. Hereinafter, the present embodiment is described in detail.

[Preparation of Platinum Catalyst]

The carrier used in the present embodiment is a carbon fine powder (trade name: Ketjenblack EC). The specific surface area of the carrier was measured by the BET one-point method and was found to be 902 m$^2$/g. In 1000 g (the amount of platinum: 46 g) of a dinitrodiamine platinum nitric acid solution having a platinum concentration of 4.6% by mass, as the platinum solution, 46 g of the carbon powder was immersed and stirred, and then 100 ml of 100% ethanol was added as a reducing agent to the solution. The solution was stirred and mixed at the boiling point of the solution for 7 hours, and thus platinum was supported on the carbon powder. Then, the solution was filtered, and the thus treated carbon powder was dried to yield a platinum catalyst having a supporting density of 50%.

[Annealing Treatment]

The annealing treatment was performed by maintaining the platinum catalyst produced by the foregoing step in 100% hydrogen gas for 1 hour at 900° C.

[Oxidizing Solution Treatment]

The platinum catalyst subjected to the foregoing heat treatment was subjected to an oxidizing solution treatment for the addition of the hydrophilic group. The heat treated catalyst was treated for 2 hours in a 3.0 mol/L nitric acid aqueous solution (the amount of the dissolved oxygen: 0.003 cm$^3$/cm$^3$ (in STP)) at 80° C., and then filtered and dried.

For the foregoing steps of producing the catalyst, the platinum particle size, the specific surface area of platinum and the amount of the bonded hydrophilic group were examined after each of the steps of the supporting of platinum, the heat treatment and the acid treatment. The measurement of the platinum particle size was performed by X-ray diffraction analysis. The specific surface area of platinum was determined on the basis of COMSA, and the quantitative determination of the hydrophilic group used a titration method.

In the titration method for measuring the amount of the functional group, first, 2.5 g of the catalyst was washed with 1 l of warm water and dried. After the drying, the catalyst was weighed so as for the amount of the carbon contained in the catalyst to be 0.25 g, and the catalyst was stirred with 55 ml of water for 10 minutes, and then the resulting mixture was subjected to ultrasonic dispersion for 2 minutes. Then, the resulting catalyst dispersion was transferred to a glove box purged with nitrogen gas and bubbled with nitrogen gas for 10 minutes. Then, in the catalyst dispersion, a 0.1 M base aqueous solution was placed in excess, the base solution was subjected to a neutralization titration with a 0.1 M hydrochloric acid, and from the point of neutralization, the amount of the functional group was quantitatively determined. Here, the base aqueous solutions of NaOH, Na$_2$CO$_3$ and NaHCO$_3$ were used, and for the respective base aqueous solutions, the neutralization titration operation was performed. This is because the different bases used neutralize the different types of functional groups; NaOH neutralizes the carboxyl group, the lactone group and the hydroxyl group, Na$_2$CO$_3$ neutralizes the carboxyl group and the lactone group, and NaHCO$_3$ neutralizes the carboxyl groups. From the types and the amounts of the three bases used in the titration and the consumed amounts of hydrochloric acid, the amounts of the functional groups on the catalyst surface were derived. For the identification of the point of neutralization, a pH meter was used; the adopted points of neutralization for NaOH, Na$_2$CO$_3$ and NaHCO$_3$ were pH 7.0, pH 8.5 and pH 4.5, respectively.

Table 1 shows the measurement results of the platinum particle size, the platinum specific surface area and the amount of the bonded hydrophilic group in each of the steps in the production of catalyst. As can be seen from the table presented below, the heat treatment increases the platinum particle size and decreases the platinum specific surface area. On the other hand, the heat treatment remarkably decreases the amount of the hydrophilic group. As can also be seen from the table, the subsequently performed oxidation treatment increases the amount of the hydroxyl group, which once decreased by the heat treatment.

TABLE 1

| | Platinum particle size (nm) | Platinum specific surface area (m$^2$/g) | Amount of bonded hydrophilic group (mmol/g) | | | |
|---|---|---|---|---|---|---|
| | | | Total | Hydroxyl group | Lactone group | Carboxyl group |
| After supporting of platinum | 2.5 | 127 | 0.88 | 0.17 | 0.31 | 0.40 |
| After heat treatment | 4.5 | 76 | 0.32 | 0.00 | 0.19 | 0.13 |
| After heat and acid treatments (Present embodiment) | 4.4 | 77 | 0.86 | 0.08 | 0.29 | 0.49 |

Next, the power generation property of the catalyst produced in the present embodiment was evaluated. In the evaluation, the electrode (air electrode) was produced from the catalyst to form a fuel cell, and the power generation property of the fuel cell was evaluated. In the production of the air electrode, 0.5 g of a resin powder produced by spray drying a 5% solution of an ion exchange resin (trade name: Nafion (registered trademark), manufactured by DuPont Corp.) and 0.8 g of the catalyst were subjected to wetting treatment with 4 ml of water, placed in 8 ml of a mixed aqueous solution of 2-propanol/n-propanol, and mixed for 50 minutes with a ball mill to produce a catalyst paste. The catalyst paste was coat printed, so as for the platinum amount to be 0.5 mg/cm$^2$, on a gas diffusion layer produced by surface layer coating of carbon paper with carbon and FEP, and with carbon and Nafion. The catalyst-coated gas diffusion layer was dried at 100° C., and then hot pressed at 130° C. with a load of 20 kg/cm$^2$ for 1 minute to prepare an electrode.

The electrode was used as the air electrode to constitute a fuel cell, and the initial power generation property and the durability of the fuel cell were evaluated. The initial power generation property was evaluated under the following measurement conditions, on the basis of the cell voltage at a predetermined current density (0.5 A/cm$^2$).

Electrode area: 25 cm$^2$
Set utilization efficiency: 40%
Temperature: 80° C.

Pressure: Atmospheric pressure
Anode gas: Pure hydrogen
Cathode gas: Oxygen
Humidification condition: For anode, humidity: 100%; for cathode: no humidification In the property evaluation of the durability, an accelerated degradation test of triangle sweeping of the cell potential of the cathode was performed and the power generation property after the degradation was measured. The accelerated degradation was performed by sweeping of 3600 cycles between 650 and 1050 mV, at a sweeping rate of 40 mV/s, and further, degradation was performed by sweeping of 21600 cycles at an increased sweeping rate of 100 mV/s. The measurement conditions were the same as in the initial property evaluation. Table 2 shows the thus obtained evaluation results of the power generation property.

TABLE 2

|  | Initial cell voltage (V) | Cell voltage after endurance test (V) |
|---|---|---|
| After supporting of platinum | 0.774 | 0.748 |
| After heat treatment | 0.759 | 0.760 |
| After heat and oxidizing solution treatments (Present embodiment) | 0.777 | 0.776 |

Cell voltage is the voltage value at 0.5 A/cm$^2$.

As can be seen from the evaluation results of the power generation property, in particular, from a comparison between the initial cell voltage obtained with the catalyst immediately after the supporting of platinum and the initial cell voltage obtained with the catalyst subjected only to heat treatment, the heat treatment degrades the initial power generation property. Also as can be seen from Table 2, the catalyst of the present embodiment, obtained by adding the hydrophilic group by the oxidizing solution treatment of the catalyst after the heat treatment improves the initial power generation property, to be equivalent to the initial power generation property obtained with the catalyst immediately after the supporting of platinum.

As far as the durability is concerned, the platinum supporting catalyst decreases the cell voltage due to the degradation caused by the endurance test, and on the other hand, the catalyst subjected only to the heat treatment gives a lower initial voltage, but maintains the level of the initial voltage even after the endurance test; thus, only from the viewpoint of the durability, the heat treated catalyst can be said to be superior to the catalyst after the supporting of platinum. The catalyst of the present embodiment, subjected to the oxidizing solution treatment has a high initial voltage and maintains this level even after the degradation, and is found to be excellent both in the initial property and in the durability.

Second Embodiment

Here, the relation between the amount of the bonded hydrophilic group and the power generation property was investigated. In this investigation, catalysts were produced by regulating the amount of the hydrophilic group by varying the conditions of the hydrophilic group addition (the concentration of the oxidizing solution, the treatment time), and the power generation property performed with these catalysts were evaluated. In this investigation, the platinum supporting catalyst and the steps of the heat treatment and the like were the same as those in the first embodiment. The oxidizing treatment was performed in the same manner as in the first embodiment except that the type and the concentration of the oxidizing solution were altered. In the evaluation of the power generation property, the electrodes were prepared in the same manner as in the first embodiment and the initial cell voltages obtained with these electrodes were measured.

TABLE 3

| Sample No. | Oxidizing solution; type and concentration | Treatment temperature and time | Amount of bonded hydrophilic group (mmol/g) | | | | Initial cell voltage value (V) |
|---|---|---|---|---|---|---|---|
| | | | Total amount | Hydroxyl group | Lactone group | Carboxyl group | |
| 1 | Nitric acid 0.08 mol/L | 70° C. × 0.5 h | 0.69 | 0.09 | 0.24 | 0.36 | 0.750 |
| 2 | Nitric acid 1.00 mol/L | 70° C. × 2 h | 0.73 | 0.07 | 0.24 | 0.42 | 0.772 |
| 3 | Nitric acid 3.00 mol/L | 80° C. × 2 h | 0.86 | 0.08 | 0.29 | 0.49 | 0.778 |
| 4 | Permanganic acid 0.18 mol/L | 60° C. × 0.2 h | 2.02 | 0.17 | 0.51 | 1.34 | 0.772 |

Sample No. 3 corresponds to the first embodiment.
The cell voltages are the voltage values at 0.5 A/cm$^2$.

As can be seen from Table 3, the acid treatment conditions can regulate the amount of the bonded hydrophilic group. The catalyst (Sample No. 1) having an amount (total amount) of the bonded hydrophilic group of less than 0.7 mmol/g gave an initial cell voltage value lower by 0.02 V or more than the voltage value immediately after the supporting of platinum (see Table 2). Accordingly, the lower limit of the amount of the bonded hydrophilic group is set at 0.7 mmol/g. Even when the upper limit of the amount of the bonded hydrophilic group was set at 2.0 mmol/g, no remarkable improvement of the initial cell voltage was achieved. Accordingly, in consideration of the handleability at the time of the foregoing production, it is preferable to set the upper limit of the amount of the bonded hydrophilic group at 3.0 mmol/g.

Third Embodiment

Catalysts were produced by altering the conditions of the heat treatment subsequent to the supporting of platinum and by performing the oxidizing solution treatment, and the physical properties and the power generation property of the obtained catalysts were investigated. The catalysts were produced by allowing the same carbon fine powder carrier as in the first embodiment to support platinum under the same conditions as in the first embodiment, and heat treated in 100% hydrogen gas at temperatures of 300 to 1200° C. for 1 hour. The platinum catalysts after the heat treatment were subjected to the oxidizing solution treatment under the same conditions as in the first embodiment. Then, in the same manner as in the first embodiment, the initial power generation property and the durability were investigated. Table 4 shows the results thus obtained.

TABLE 4

| Heat treatment temperature (° C.) | Platinum particle size (nm) | Platinum specific surface area (m2/g) | Amount of hydrophilic group (total amount) (mmol/g) | Initial cell voltage (V) | Cell voltage after endurance test (V) |
|---|---|---|---|---|---|
| 300 | 3.3 | 131 | 0.48 | 0.771 | 0.725 |
| 650 | 3.7 | 95 | 0.88 | 0.766 | 0.765 |
| 800 | 3.8 | 93 | 0.95 | 0.776 | 0.773 |
| 1150 | 6.6 | 51 | 0.81 | 0.783 | 0.772 |
| 1200 | 8.1 | 39 | 0.85 | 0.730 | 0.767 |

The cell voltages are the voltage values at 0.5 A/cm$^2$.

As can be seen from Table 4 3, with the increase of the heat treatment temperature, the platinum particle size increased and the platinum specific surface area (COMSA) decreased. As an investigation from the power generation property, when the heat treatment temperature was set at 300° C., the cell voltage decrease after the endurance test became large. When the heat treatment temperature was 1200° C., the platinum particle size exceeded 8.0 nm and the initial cell voltage was low. Consequently, the heat treatment within an appropriate range is required.

Fourth Embodiment

Here, catalysts were produced by regulating the water vapor adsorption amount in each of the catalysts in addition to the amount of the bonded hydrophilic group, and the properties of the obtained catalysts were examined. The investigation is basically the same as in the second embodiment; the catalysts were produced by setting the amount of the dissolved oxygen at 0.01 cm$^3$/cm$^3$ (in STP) and by increasing the number of times of the contact (the number of times of the treatment) of each of the catalysts with the oxidizing solution to two times, and by thus performing the bonding of the hydrophilic group and the water vapor adsorption. The oxidizing solution concentration and the treatment time at a time were the same as in the second embodiments. The production, and the steps of the heat treatment and the like of the platinum supporting catalyst were the same as in the first embodiment. Further, in the evaluation of the power generation property, the electrodes were prepared by the same method as in the first embodiment, and the initial cell voltage was measured.

The measurement method of the water vapor adsorption amount of each of the catalysts was such that about 0.100 g of the catalyst was weighed out in a sample tube, the sample tube was set in a gas/vapor adsorption amount measurement apparatus, and the sample was subjected to a pretreatment (drying treatment) under vacuum at 150° C. for 30 minutes. Then, with the measurement apparatus, the water vapor adsorption isotherm at 25° C. was measured and the maximum value thereof was taken as the water vapor adsorption amount. Table 5 shows the results thus obtained. In Table 5, only the total amount is shown for the amount of the hydrophilic group.

TABLE 5

| Sample No. | Oxidizing solution; type and concentration | Treatment temperature and time | Amount of bonded hydrophilic group (total amount) (mmol/g) | Water vapor adsorption amount (cm$^3$/g) | Initial cell voltage value (V) |
|---|---|---|---|---|---|
| 5 | Nitric acid 0.08 mol/L | (70° C. × 0.5 hr) × twice | 0.72 | 171.5 | 0.760 |
| 6 | Nitric acid 1.00 mol/L | (70° C. × 2 hr) × twice | 0.77 | 181.58 | 0.780 |
| 7 | Nitric acid 3.00 mol/L | (80° C. × 2 hr) × twice | 0.90 | 198.7 | 0.785 |
| 8 | Permanganic acid 0.18 mol/L | (60° C. × 0.2 hr) × twice | 2.12 | 189.7 | 0.770 |
| 9 | Immediately after supporting of platinum | — | 0.88 | 201.2 | 0.774 |
| 10 | Annealing treatment only | — | 0.32 | 119.4 | 0.759 |

The cell voltages are the voltage values at 0.5 A/cm$^2$.

As can be seen from Table 5, the catalyst subjected to the annealing treatment underwent the decrease of the water vapor adsorption amount as well as the decrease of the amount of the bonded hydrophilic group. As can also be seen from Table 5, the contact treatment with the oxidizing solution regulated in the amount of the dissolved oxygen increased the water vapor adsorption amount as well as the amount of the bonded hydrophilic group, and these amounts approached the values found immediately after the supporting of platinum. The amount of the bonded hydrophilic group was seen to be slightly increased by the increase of the number of times of the treatment. It has also been able to be verified that the catalysts subjected to the contact treatment with the oxidizing solution regulated in the amount of the dissolved oxygen were also improved in the initial activity.

INDUSTRIAL APPLICABILITY

According to the present invention, the electrode of a polymer electrolyte fuel cell can achieve both of the improvement of the durability and the improvement of the initial power generation property. The present invention contributes to the spread of the fuel cell, and additionally offers a basis for the solution of environmental problems.

What is claimed is:

1. A catalyst for a polymer electrolyte fuel cell comprising catalyst particles made of platinum supported on a carbon powder carrier, wherein the carbon powder carrier comprises 0.81 to 3.0 mmol/g, based on the weight of the carrier, of a hydrophilic group bonded thereto; and the platinum particles have an average particle size of 3.5 to 8.0 nm and the platinum specific surface area based on CO adsorption of 40 to 100 $m^2/g$, wherein the hydrophilic group comprises a lactone group and at least one of a hydroxyl group and a carboxyl group.

2. The catalyst for a polymer electrolyte fuel cell according to claim 1 wherein water vapor is adsorbed on the carbon powder carrier in an amount of 150 to 250 $cm^3/g$ based on the mass of the catalyst at standard temperature and pressure.

3. The catalyst for a polymer electrolyte fuel cell according to claim 2, wherein a supporting density of the catalyst particles is 30 to 70%.

4. A method for producing the catalyst for a polymer electrolyte fuel cell, defined in claim 3, comprising: a step of heat treating at 600 to 1180° C. for 1 hour or less a platinum catalyst comprising platinum particles supported on a carbon powder carrier; and a step of bonding a hydrophilic group to the surface of the carrier by at least once bringing the platinum catalyst after the heat treatment in contact with an oxidizing solution.

5. A method for producing the catalyst for a polymer electrolyte fuel cell, defined in claim 2, comprising: a step of heat treating at 600 to 1180° C. for 1 hour or less a platinum catalyst comprising platinum particles supported on a carbon powder carrier; and a step of bonding a hydrophilic group to the surface of the carrier by at least once bringing the platinum catalyst, after the heat treatment in contact with an oxidizing solution.

6. The method for producing the catalyst for a polymer electrolyte fuel cell according to claim 5, wherein the oxidizing solution comprises at least one of sulfuric acid, nitric acid, phosphorous acid, potassium permanganate, hydrogen peroxide, hydrochloric acid, chloric acid, hypochlorous acid and chromic acid.

7. The catalyst for a polymer electrolyte fuel cell according to claim 1 wherein a supporting density of the catalyst particles is 30 to 70%.

8. A method for producing the catalyst for a polymer electrolyte fuel cell, defined in claim 7, comprising: a step of heat treating at 600 to 1180° C. for 1 hour or less a platinum catalyst comprising platinum particles supported on a carbon powder carrier; and a step of bonding a hydrophilic group to the surface of the carrier by at least once bringing the platinum catalyst after the heat treatment in contact with an oxidizing solution.

9. The method for producing the catalyst for a polymer electrolyte fuel cell according to claim 8, wherein the oxidizing solution comprises at least one of sulfuric acid, nitric acid, phosphorous acid, potassium permanganate, hydrogen peroxide, hydrochloric acid, chloric acid, hypochlorous acid and chromic acid.

10. A method for producing the catalyst for a polymer electrolyte fuel cell defined in claim 1 comprising: a step of heat treating at 600 to 1180° C. for 1 hour or less a platinum catalyst comprising platinum particles supported on a carbon powder carrier; and a step of bonding a hydrophilic group to the surface of the carrier by at least once bringing the platinum catalyst after the heat treatment in contact with an oxidizing solution.

11. The method for producing the catalyst for a polymer electrolyte fuel cell according to claim 10, wherein the oxidizing solution comprises at least one of sulfuric acid, nitric acid, phosphorous acid, potassium permanganate, hydrogen peroxide, hydrochloric acid, chloric acid, hypochlorous acid and chromic acid.

12. The method for producing the catalyst for a polymer electrolyte fuel cell according to claim 10 or 11, wherein the oxidizing solution comprises dissolved oxygen and the amount of the dissolved oxygen in the oxidizing solution is 0.01 to 0.02 $cm^3$ oxygen volume per $cm^3$ of the oxidizing solution at standard temperature and pressure.

* * * * *